US008494913B2

(12) United States Patent
Cavagnaro

(10) Patent No.: US 8,494,913 B2
(45) Date of Patent: Jul. 23, 2013

(54) MULTI-PARTY PAYMENT OBJECT ORIENTED SYSTEM AND METHOD

(75) Inventor: James Cavagnaro, Pittsford, NY (US)

(73) Assignee: PayAsOne LLC, Salem, NH (US)

( * ) Notice: Subject to any disclaimer, the term of this patent is extended or adjusted under 35 U.S.C. 154(b) by 0 days.

(21) Appl. No.: 13/453,674

(22) Filed: Apr. 23, 2012

(65) Prior Publication Data

US 2012/0215660 A1    Aug. 23, 2012

Related U.S. Application Data

(63) Continuation of application No. 12/980,105, filed on Dec. 28, 2010, now Pat. No. 8,170,922.

(60) Provisional application No. 61/322,623, filed on Apr. 9, 2010.

(51) Int. Cl.
*G06Q 30/00* (2012.01)

(52) U.S. Cl.
USPC ........................................................ 705/26.1

(58) Field of Classification Search
USPC ........................................................ 705/26.1
See application file for complete search history.

(56) References Cited

U.S. PATENT DOCUMENTS

| 5,663,547 | A  | 9/1997  | Ziarno    |
| 5,665,952 | A  | 9/1997  | Ziarno    |
| 5,696,366 | A  | 12/1997 | Ziarno    |
| 5,794,219 | A  | 8/1998  | Brown     |
| 7,343,335 | B1 | 3/2008  | Olliphant |
| 7,792,699 | B2 | 9/2010  | Kwei      |
| 7,970,654 | B2 | 6/2011  | Clibanoff |
| 2001/0049616 | A1 | 12/2001 | Khuzadi et al. |
| 2002/0138573 | A1 | 9/2002  | Saguy     |
| 2004/0014228 | A1 | 1/2004  | Brignac, Jr. et al. |
| 2004/0181452 | A1 | 9/2004  | DeLaCruz  |

(Continued)

FOREIGN PATENT DOCUMENTS

| WO | WO 96/11449  | 4/1996  |
| WO | WO 00/77703  | 12/2000 |
| WO | WO 01/29787  | 4/2001  |
| WO | WO 02/095635 | 11/2002 |

OTHER PUBLICATIONS

Web pages, "ChipIn", downloaded from http://www.chipin.com on Nov. 4, 2010 (4 pgs.).

(Continued)

*Primary Examiner* — Mila Airapetian
(74) *Attorney, Agent, or Firm* — Reichel IP LLP; Kevin R. Erdman; Mark C. Reichel

(57) ABSTRACT

The present invention involves a server for accommodating multiple e-commerce payments. The server includes a processor with a communications device and software modules. The vendor software module receives payment requirements from a vendor, and also receives payment parameters from an initiator. The payment parameters include an item payment amount and an identification of contributors. The contributor software module obtains payment information from the initiator and/or contributors sufficient to authorize the commitment of funds to a transaction. The aggregation software module sends participation messages to contributors. The participation messages include information on the item, the item payment amount, and directions for the contributor to interact with the contributor module. Further, the aggregation software module maintains a total of committed funds and initiates a payment transaction when the committed funds are sufficient to pay the vendor.

27 Claims, 4 Drawing Sheets

U.S. PATENT DOCUMENTS

2005/0256866 A1 11/2005 Lu et al.
2010/0010906 A1* 1/2010 Grecia .......................... 705/21
2011/0016023 A1 1/2011 Zakas

OTHER PUBLICATIONS

Bill Clerioc and Rich Aberman, web pages, "Our Story/WePay", downloaded from http://www.wepay.com/about/wepay on Nov. 4, 2010 (2 pgs.).

Crowdrise web pages, "About Crowdrise", downloaded from http://www.crowdrise.com/about on Nov. 4, 2010 (10 pgs).

DonorsChoose.org web page "How it Works/School Donations", downloaded from http://www.donorschoose.org/about/how_it_works.html on Nov. 4, 2010 (1 pg.).

eDivvy webpage, "About Us", downloaded from http://www.edivvy.com/company/about on Nov. 4, 2010 (7 pgs.).

Pay It Square web page "How it Works for Group Payments—Pay It Square", downloaded from http://www.payitsquare.com/how-it-works/group-payments.aspx on Nov. 4, 2010, (2 pgs.).

Web pages, "What is GoFundMe?", downloaded from http://www.gofundme.com/questions/on Nov. 8, 2010 (6 pgs.).

ABCNews Web page, "Splitting the Check as Easy as "Bumping" Phones", downloaded from http://abcnews.go.com/Technology/AheadoftheCurve/splitting-check-easy-bumping-phones on Aug. 6, 2010.

* cited by examiner

MULTI-PARTY PAYMENT OBJECT ORIENTED SYSTEM AND METHOD

CROSS REFERENCE TO RELATED APPLICATIONS

This application is a continuation of U.S. application Ser. No. 12/980,105, filed Dec. 28, 2010, now U.S. Pat. No. 8,170,922, which claims the benefit of U.S. Provisional Patent Application Ser. No. 61/322,623, filed Apr. 9, 2010, the disclosure of each of which is hereby expressly incorporated by reference herein.

BACKGROUND OF THE INVENTION

1. Field of the Invention

The invention relates to e-commerce payment system software. More specifically, the field of the invention is that of e-commerce payment system software for network based transactions.

2. Description of the Related Art

The internet is being used by individuals to purchase products online primarily through e-commerce sites. An individual purchases and pays for the selected product or service, typically using a shopping cart of the selling website. The shopping cart collects the individual's information, including both payment and delivery information. Once the payment information is validated and the transaction processed, typically through the use of a credit card, the delivery information is used to actually send the product or deliver the services. In the case of a gift, the individual providing the payment information may supply another person's delivery information.

While the typical internet e-commerce transaction involves a credit card, further web sites have been developed that provide for payments through other mechanisms, such as direct bank transfer (e.g., Automated Clearing House transactions, or ACH) or through an online payment system (e.g., PayPal, PayPal being a registered trademark of PayPal, Inc. of San Jose, Calif.). To expand the role of e-commerce and to develop new revenue streams for existing e-commerce sites, new payment systems are desired.

SUMMARY OF THE INVENTION

The present invention is an internet based system and method which provide a process and system for allowing more than one individual to contribute to the payment of one product as a joint/shared purchase. Briefly stated, the initiating party for a transaction specifies one or more contributors for paying for the transaction. The system according to one embodiment of the invention sends invitations to participate in the purchase of the item for the designated individual. The invitations may be sent by phone, text message, instant messaging, e-mail, or other suitable transmission, and may include a key or other descriptor identifying the joint/shared purchase product. The initiating party may hold the joint/shared purchase product, e.g., by committing points to the purchase. The system accumulates payment commitments until the necessary amount of funds are obtained, then the system processes the purchase.

In one embodiment, the invention relates to a server for accommodating multiple party payments for a single item in an e-commerce transaction. The server includes a processor with a communications device and particular software modules. The vendor software module obtains or receives payment requirements from a vendor via the communications device. The vendor software module further obtains or receives payment parameters from an initiator via the communications device. The payment parameters include an item payment amount and an identification of at least one contributor. The contributor software module obtains or receives payment information from at least one of the initiator and the contributor wherein the payment information is sufficient to authorize the commitment of points to a transaction. The aggregation software module sends a participation message via the communications device to at least one contributor. The participation message includes information on the item, the item payment amount, and directions for the contributor to interact with the contributor software module. The aggregation software module further maintains a total of committed points and initiates a payment transaction when the committed points are sufficient to pay the vendor the item payment amount.

In further embodiments, the vendor software module further includes a contributor designator software module for collecting a plurality of contributor identifiers. The contributor identifiers include at least two of: a telephone number, a website user name, a social network user name, a user identifier from a known computer system, a financial institution account identifier, a rewards program identifier, and a frequent flyer program identifier. The contributor software module further includes communication software module for communicating with the contributors through at least two of the following communications channels: a local computer network, a wireless network, a wide area network, a wireless network, an electronic telephony network, radio, microwave, other telecommunications, a conventional voice telephony network, a retail outlet, and a paper based communication. The contributor software module further an includes individual message software module that allows the initiator to enter an individual message for at least one contributor. The aggregation software module further includes monitor software module for displaying the current status of each contributor. The aggregation software module further allows an initiator to send a message to one of the contributors. The aggregation software module further includes software for automatically sending reminder messages to one of the contributors according to a predetermined criteria.

In a further embodiment of the invention, the contributor software module provides software for enabling a contributor to become an initiator and promulgate further participation messages to further potential contributors. This allows a network effect for expanding the number of possible participants to much more than the original list of potential contributors. In situations where a finite amount of contributions in not necessary, for example a gift certificate or charity fund raiser, the initiator need not specify a definite payment amount. In fact, such situations may not even have a time limitation, for example a charity fund raising campaign. In this way, obtaining funds may be accomplished with contributors from multiple sources and achieve great success even though the initial contributor list may be limited. Further, the fundraising organization may reach out to new individuals that are introduced by the initiator, and the monitor software may further include software for indentifying new individuals as well as deplication software to identifying duplicate contacts from a new contributor turned initiator.

In a further embodiment of the invention, a network of merchant vendors utilizes the server. In this embodiment, multiple vendors participate in a points based exchange, so that the potential contributors may use aggregated points for one or more of the plurality of vendors. This allows initiators to accumulate points for a purchase with one or more of such vendors without having to deposit actual monetary funds with a banking institution. Further, should fund raising for a particular purchase or project fall short, the points may be redeployed with another vendor in the network of merchant vendors or remitted back to the contributors seamlessly.

Further aspects of the embodiments of the invention relate to the method of operation of such server and software, and a computer readable media storing instructions for performing such a method.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
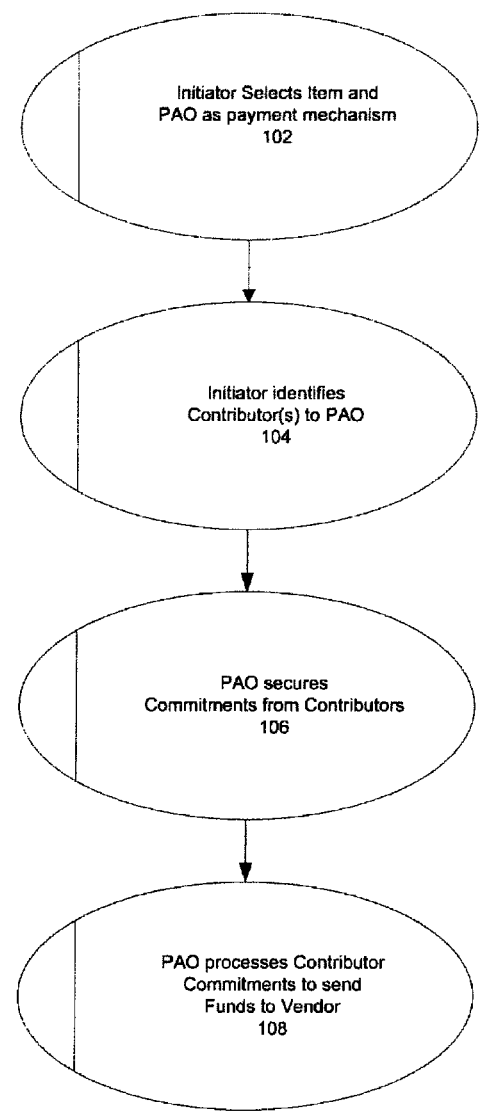
FIG. 1 is a flow chart diagram of the operation of the present invention relating to one embodiment of the multiple party payment system.

Corresponding reference characters indicate corresponding parts throughout the several views. Although the drawings represent embodiments of the present invention, the drawings are not necessarily to scale and certain features may be exaggerated in order to better illustrate and explain the present invention. The flow charts and screen shots are also representative in nature, and actual embodiments of the invention may include further features or steps not shown in the drawings. The exemplification set out herein illustrates an embodiment of the invention, in one form, and such exemplifications are not to be construed as limiting the scope of the invention in any manner.

DESCRIPTION OF THE PRESENT INVENTION

The embodiment disclosed below is not intended to be exhaustive or limit the invention to the precise form disclosed in the following detailed description. Rather, the embodiment is chosen and described so that others skilled in the art may utilize its teachings.

The detailed descriptions which follow are presented in part in terms of algorithms and symbolic representations of operations on data bits within a computer memory representing alphanumeric characters or other information. A computer generally includes a processor for executing instructions and memory for storing instructions and data. When a general purpose computer has a series of machine encoded instructions stored in its memory, the computer operating on such encoded instructions may become a specific type of machine, namely a computer particularly configured to perform the operations embodied by the series of instructions. Some of the instructions may be adapted to produce signals that control operation of other machines and thus may operate through those control signals to transform materials far removed from the computer itself These descriptions and representations are the means used by those skilled in the art of data processing arts to most effectively convey the substance of their work to others skilled in the art.

An algorithm is here, and generally, conceived to be a self consistent sequence of steps leading to a desired result. These steps are those requiring physical manipulations of physical quantities. Usually, though not necessarily, these quantities take the form of electrical or magnetic pulses or signals capable of being stored, transferred, transformed, combined, compared, and otherwise manipulated. It proves convenient at times, principally for reasons of common usage, to refer to these signals as bits, values, symbols, characters, display data, terms, numbers, or the like as a reference to the physical items or manifestations in which such signals are embodied or expressed. It should be borne in mind, however, that all of these and similar terms are to be associated with the appropriate physical quantities and are merely used here as convenient labels applied to these quantities.

Some algorithms may use data structures for both inputting information and producing the desired result. Data structures greatly facilitate data management by data processing systems, and are not accessible except through sophisticated software systems. Data structures are not the information content of a memory, rather they represent specific electronic structural elements which impart or manifest a physical organization on the information stored in memory. More than mere abstraction, the data structures are specific electrical or magnetic structural elements in memory which simultaneously represent complex data accurately, often data modeling physical characteristics of related items, and provide increased efficiency in computer operation.

Further, the manipulations performed are often referred to in terms, such as comparing or adding, commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases the distinction between the method operations in operating a computer and the method of computation itself should be recognized. The present invention relates to a method and apparatus for operating a computer in processing electrical or other (e.g., mechanical, chemical) physical signals to generate other desired physical manifestations or signals. The computer operates on software modules, which are collections of signals stored on a media that represents a series of machine instructions that enable the computer processor to perform the machine instructions that implement the algorithmic steps. Such machine instructions may be the actual computer code the processor interprets to implement the instructions, or alternatively may be a higher level coding of the instructions that is interpreted to obtain the actual computer code. The software module may also include a hardware component, wherein some aspects of the algorithm are performed by the circuitry itself rather as a result of a instruction.

The present invention also relates to an apparatus for performing these operations. This apparatus may be specifically constructed for the required purposes or it may comprise a general purpose computer as selectively activated or reconfigured by a computer program stored in the computer. The algorithms presented herein are not inherently related to any particular computer or other apparatus unless explicitly indicated as requiring particular hardware. In some cases, the computer programs may communicate or relate to other programs or equipments through signals configured to particular protocols which may or may not require specific hardware or programming to interact. In particular, various general purpose machines may be used with programs written in accordance with the teachings herein, or it may prove more convenient to construct more specialized apparatus to perform the required method steps. The required structure for a variety of these machines will appear from the description below.

The present invention may deal with "object oriented" software, and particularly with an "object oriented" operating system. The "object oriented" software is organized into "objects", each comprising a block of computer instructions describing various procedures ("methods") to be performed in response to "messages" sent to the object or "events" which occur with the object. Such operations include, for example, the manipulation of variables, the activation of an object by an external event, and the transmission of one or more messages to other objects.

Messages are sent and received between objects having certain functions and knowledge to carry out processes. Messages are generated in response to user instructions, for example, by a user activating an icon with a "mouse" pointer generating an event. Also, messages may be generated by an object in response to the receipt of a message. When one of the objects receives a message, the object carries out an operation (a message procedure) corresponding to the message and, if necessary, returns a result of the operation. Each object has a region where internal states (instance variables) of the object itself are stored and where the other objects are not allowed to access. One feature of the object oriented system is inheritance. For example, an object for drawing a "circle" on a display may inherit functions and knowledge from another object for drawing a "shape" on a display.

A programmer "programs" in an object oriented programming language by writing individual blocks of code each of which creates an object by defining its methods. A collection of such objects adapted to communicate with one another by means of messages comprises an object oriented program. Object oriented computer programming facilitates the modeling of interactive systems in that each component of the system can be modeled with an object, the behavior of each component being simulated by the methods of its corresponding object, and the interactions between components being simulated by messages transmitted between objects.

An operator may stimulate a collection of interrelated objects comprising an object oriented program by sending a message to one of the objects. The receipt of the message may cause the object to respond by carrying out predetermined functions which may include sending additional messages to one or more other objects. The other objects may in turn carry out additional functions in response to the messages they receive, including sending still more messages. In this manner, sequences of message and response may continue indefinitely or may come to an end when all messages have been responded to and no new messages are being sent. When modeling systems utilizing an object oriented language, a programmer need only think in terms of how each component of a modeled system responds to a stimulus and not in terms of the sequence of operations to be performed in response to some stimulus. Such sequence of operations naturally flows out of the interactions between the objects in response to the stimulus and need not be preordained by the programmer.

Although object oriented programming makes simulation of systems of interrelated components more intuitive, the operation of an object oriented program is often difficult to understand because the sequence of operations carried out by an object oriented program is usually not immediately apparent from a software listing as in the case for sequentially organized programs. Nor is it easy to determine how an object oriented program works through observation of the readily apparent manifestations of its operation. Most of the operations carried out by a computer in response to a program are "invisible" to an observer since only a relatively few steps in a program typically produce an observable computer output.

In the following description, several terms which are used frequently have specialized meanings in the present context. The term "object" relates to a set of computer instructions and associated data which can be activated directly or indirectly by the user. The terms "windowing environment", "running in windows", and "object oriented operating system" are used to denote a computer user interface in which information is manipulated and displayed on a video display such as within bounded regions on a raster scanned video display. The terms "network", "local area network", "LAN", "wide area network", or "WAN" mean two or more computers which are connected in such a manner that messages may be transmitted between the computers. In such computer networks, typically one or more computers operate as a "server", a computer with large storage devices such as hard disk drives and communication hardware to operate peripheral devices such as printers or modems. Other computers, termed "workstations", provide a user interface so that users of computer networks can access the network resources, such as shared data files, common peripheral devices, and inter workstation communication. Users activate computer programs or network resources to create "processes" which include both the general operation of the computer program along with specific operating characteristics determined by input variables and its environment. Similar to a process is an agent (sometimes called an intelligent agent), which is a process that gathers information or performs some other service without user intervention and on some regular schedule. Typically, an agent, using parameters typically provided by the user, searches locations either on the host machine or at some other point on a network, gathers the information relevant to the purpose of the agent, and presents it to the user on a periodic basis.

The term "desktop" means a specific user interface which presents a menu or display of objects with associated settings for the user associated with the desktop. When the desktop accesses a network resource, which typically requires an application program to execute on the remote server, the desktop calls an Application Program Interface, or "API", to allow the user to provide commands to the network resource and observe any output. The term "Browser" refers to a program which is not necessarily apparent to the user, but which is responsible for transmitting messages between the desktop and the network server and for displaying and interacting with the network user. Browsers are designed to utilize a communications protocol for transmission of text and graphic information over a world wide network of computers, namely the "World Wide Web" or simply the "Web". Examples of Browsers compatible with the present invention include the Internet Explorer program sold by Microsoft Corporation (Internet Explorer is a trademark of Microsoft Corporation), the Opera Browser program created by Opera Software ASA, or the Firefox browser program distributed by the Mozilla Foundation (Firefox is a registered trademark of the Mozilla Foundation). Although the following description details such operations in terms of a graphic user interface of a Browser, the present invention may be practiced with text based interfaces, or even with voice or visually activated interfaces, that have many of the functions of a graphic based Browser.

Browsers display information which is formatted in a Standard Generalized Markup Language ("SGML") or a HyperText Markup Language ("HTML"), both being scripting languages which embed non visual codes in a text document through the use of special ASCII text codes. Files in these formats may be easily transmitted across computer networks, including global information networks like the Internet, and allow the Browsers to display text, images, and play audio and video recordings. The Web utilizes these data file formats to conjunction with its communication protocol to transmit such information between servers and workstations. Browsers may also be programmed to display information provided in an eXtensible Markup Language ("XML") file, with XML files being capable of use with several Document Type Definitions ("DTD") and thus more general in nature than SGML or HTML. The XML file may be analogized to an object, as the data and the stylesheet formatting are separately contained (formatting may be thought of as methods of displaying information, thus an XML file has data and an associated method).

The terms "personal digital assistant" or "PDA", as defined above, means any handheld, mobile device that combines computing, telephone, fax, e-mail and networking features. The terms "wireless wide area network" or "WWAN" mean a wireless network that serves as the medium for the transmission of data between a handheld device and a computer. The term "synchronization" means the exchanging of information between a first device, e.g. a handheld device, and a second device, e.g. a desktop computer, either via wires or wirelessly. Synchronization ensures that the data on both devices are identical (at least at the time of synchronization).

In wireless wide area networks, communication primarily occurs through the transmission of radio signals over analog, digital cellular, or personal communications service ("PCS") networks. Signals may also be transmitted through microwaves and other electromagnetic waves. At the present time, most wireless data communication takes place across cellular systems using second generation technology such as code-division multiple access ("CDMA"), time division multiple access ("TDMA"), the Global System for Mobile Communications ("GSM"), Third Generation (wideband or "3G"), Fourth Generation (broadband or "4G"), personal digital cellular ("PDC"), or through packet-data technology over analog systems such as cellular digital packet data (CDPD") used on the Advance Mobile Phone Service ("AMPS").

The terms "wireless application protocol" or "WAP" mean a universal specification to facilitate the delivery and presentation of web-based data on handheld and mobile devices with small user interfaces. "Mobile Software" refers to the software operating system which allows for application programs to be implemented on a mobile device such as a mobile telephone or PDA. Examples of Mobile Software are Java® and Java ME® (Java and JavaME are trademarks of Sun Microsystems, Inc. of Santa Clara, Calif.), BREW® (BREW is a registered trademark of Qualcomm Incorporated of San Diego, Calif.), Windows Mobile® (Windows is a registered trademark of Microsoft Corporation of Redmond, Wash.), Palm OS® (Palm is a registered trademark of Palm, Inc. of Sunnyvale, Calif.), Symbian OS® (Symbian is a registered trademark of Symbian Software Limited Corporation of London, United Kingdom), ANDROID OS® (ANDROID is a registered trademark of Google, Inc. of Mountain View, Calif.), and iPhone OS® (iPhone is a registered trademark of Apple, Inc. of Cupertino, Calif.). "Mobile Apps" refers to software programs written for execution with Mobile Software.

In the following specification, the term "social network" may be used to refer to a multiple user computer software system that allows for relationships among and between users (individuals or members) and content assessible by the system. Generally, a social network is defined by the relationships among groups of individuals, and may include relationships ranging from casual acquaintances to close familial bonds. In addition, members may be other entities that may be linked with individuals. The logical structure of a social network may be represented using a graph structure. Each node of the graph may correspond to a member of the social network, or content assessible by the social network. Edges connecting two nodes represent a relationship between two individuals. In addition, the degree of separation between any two nodes is defined as the minimum number of hops required to traverse the graph from one node to the other. A degree of separation between two members is a measure of relatedness between the two members.

Social networks may comprise any of a variety of suitable arrangements. An entity or member of a social network may have a profile and that profile may represent the member in the social network. The social network may facilitate interaction between member profiles and allow associations or relationships between member profiles. Associations between member profiles may be one or more of a variety of types, such as friend, co-worker, family member, business associate, common-interest association, and common-geography association. Associations may also include intermediary relationships, such as friend of a friend, and degree of separation relationships, such as three degrees away. Associations between member profiles may be reciprocal associations. For example, a first member may invite another member to become associated with the first member and the other member may accept or reject the invitation. A member may also categorize or weigh the association with other member profiles, such as, for example, by assigning a level to the association. For example, for a friendship-type association, the member may assign a level, such as acquaintance, friend, good friend, and best friend, to the associations between the member's profile and other member profiles.

Each profile within a social network may contain entries, and each entry may comprise information associated with a profile. Examples of entries for a person profile may comprise contact information such as an email addresses, mailing address, instant messaging (or IM) name, or phone number; personal information such as relationship status, birth date, age, children, ethnicity, religion, political view, sense of humor, sexual orientation, fashion preferences, smoking habits, drinking habits, pets, hometown location, passions, sports, activities, favorite books, music, TV, or movie preferences, favorite cuisines; professional information such as skills, career, or job description; photographs of a person or other graphics associated with an entity; or any other information or documents describing, identifying, or otherwise associated with a profile. Entries for a business profile may comprise industry information such as market sector, customer base, location, or supplier information; financial information such as net profits, net worth, number of employees, stock performance; or other types of information and documents associated with the business profile.

A member profile may also contain rating information associated with the member. For example, the member may be rated or scored by other members of the social network in specific categories, such as humor, intelligence, fashion, trustworthiness, sexiness, and coolness. A member's category ratings may be contained in the member's profile. In one embodiment of the social network, a member may have fans. Fans may be other members who have indicated that they are "fans" of the member. Rating information may also include the number of fans of a member and identifiers of the fans. Rating information may also include the rate at which a member accumulated ratings or fans and how recently the member has been rated or acquired fans.

A member profile may also contain social network activity data associated with the member. Membership information may include information about a member's login patterns to the social network, such as the frequency that the member logs in to the social network and the member's most recent login to the social network. Membership information may also include information about the rate and frequency that a member profile gains associations to other member profiles. In a social network that comprises advertising or sponsorship, a member profile may contain consumer information. Consumer information may include the frequency, patterns, types, or number of purchases the member makes, or information about which advertisers or sponsors the member has accessed, patronized, or used.

A member profile may comprise data stored in memory. The profile, in addition to comprising data about the member, may also comprise data relating to others. For example, a member profile may contain an identification of associations or virtual links with other member profiles. In one embodiment, a member's social network profile may comprise a hyperlink associated with another member's profile. In one such association, the other member's profile may contain a reciprocal hyperlink associated with the first member's profile. A member's profile may also contain information excerpted from another associated member's profile, such as a thumbnail image of the associated member, his or her age, marital status, and location, as well as an indication of the number of members with which the associated member is associated. In one embodiment, a member's profile may comprise a list of other social network members' profiles with which the member wishes to be associated.

An association may be designated manually or automatically. For example, a member may designate associated members manually by selecting other profiles and indicating an association that may be recorded in the member's profile. According to one embodiment, associations may be established by an invitation and an acceptance of the invitation. For example, a first user may send an invitation to a second user inviting the second user to form an association with the first user. The second user may accept or reject the invitation. According to one embodiment, if the second user rejects the invitation, a one-way association may be formed between the first user and the second user. According to another embodiment, if the second user rejects the association, no association may be formed between the two users. Also, an association between two profiles may comprise an association automatically generated in response to a predetermined number of common entries, aspects, or elements in the two members' profiles. In one embodiment, a member profile may be associated with all of the other member profiles comprising a predetermined number or percentage of common entries, such as interests, hobbies, likes, dislikes, employers and/or habits. Associations designated manually by members of the social network, or associations designated automatically based on data input by one or more members of the social network, may be referred to as user established associations.

Examples of social networks include, but are not limited to, facebook, twitter, myspace, linkedin, and other systems. The exact terminology of certain features, such as associations, fans, profiles, etc. may vary from social network to social network, although there are several functional features that are common to the various terms. Thus, a particular social network may have more of less of the common features described above. In terms of the following disclosure, generally the use of the term "social network" encompasses a system that includes one or more of the foregoing features or their equivalents.

The transactions involved with the various embodiments of the present invention start with a first party selecting a product or service to purchase (we shall refer to this product or service as the "Item") from an e-commerce vendor ("Vender"). We may refer to this first party as the "Initiator" of the transaction. The Initiator then identifies additional parties ("Contributors") to participate in the payment for the selected Item, and provides the list of Contributors to the multiple party payment system (the Pay As One system, or "PAO"). PAO then contacts Contributors to attempt to secure sufficient payment commitments for the Item, for example by collecting funds or reserving funds of the Contributions accounts. Once PAO obtains sufficient payment commitments from the Initiator and/or Contributors, PAO completes the payment transaction by obtaining the required transaction information from the Initiator and/or Contributors then providing those funds to the Vendor. Alternatively, the Initiator may decide to cancel the transaction, at which point PAO releases the funds so that neither the Initiator nor Contributors provide funds to the Vendor.

Briefly described in FIG. 1, embodiments of the present invention involve methods that allow the Initiator to select an Item with PAO as the payment mechanism in step 102. In step 104, the Initiator identifies Contributors to PAO. PAO then invites Contributors to participate in the payment of the total cost of the Item, coordinating the payment from the Contributors to the Vendor in step 106 where PAO secures payments for the Contributors, e.g. by obtaining and holding funds or reserving funds, e.g., on a credit facility of each Contributor. Finally, once sufficient funds have been secured, PAO processes Contributor payments and to send funds to the Vendor in step 108.

Figure 2:
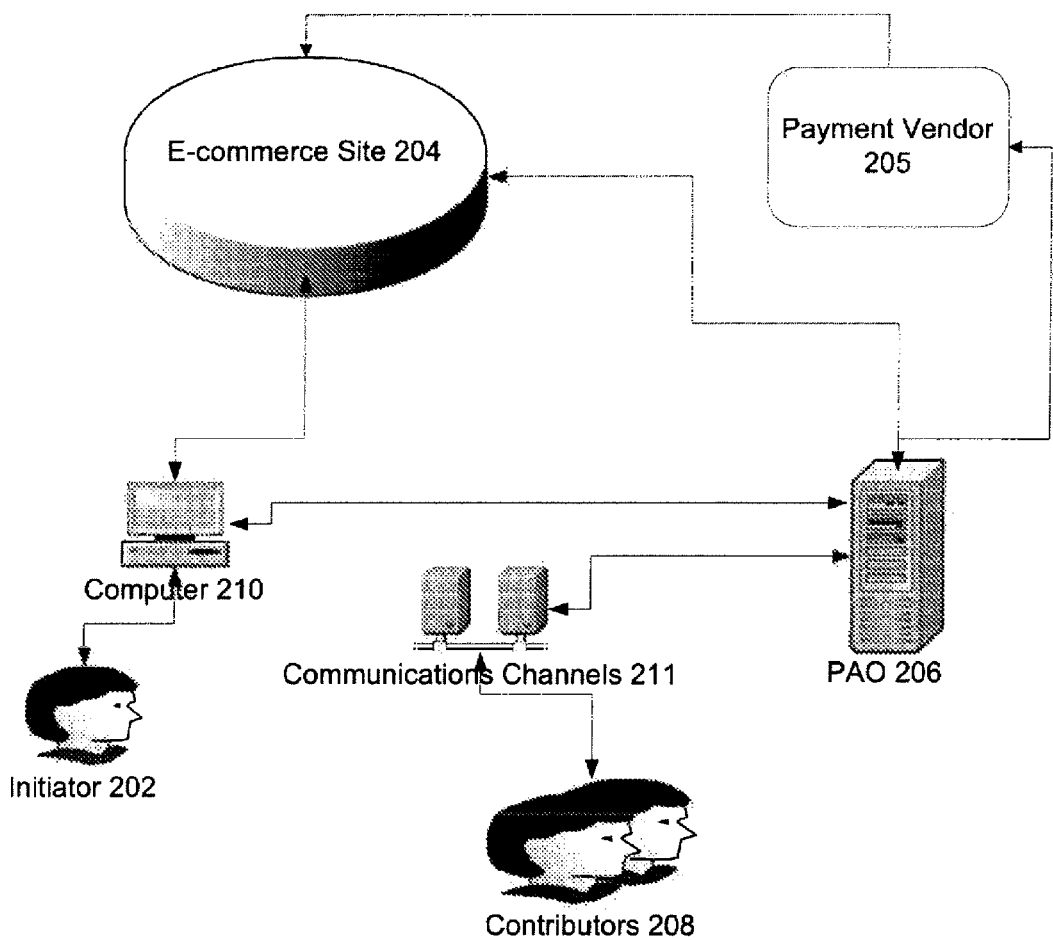
FIG. 2 is a schematic diagrammatic view of a multiple party payment system using the present invention.

FIG. 2 schematically shows such an arrangement in one embodiment of the invention. Initiator 202 may use computer 210 to access e-commerce site 204 over the Internet, through a social network, or other communication channel. When selecting a payment option, e-commerce site 204 is configured to offer PAO 206 as a payment option. Initiator 202 may thus access PAO 206 via computer 210 and a suitable communication channel to identify Contributors 208. In one embodiment, Contributors 208 are identified by e-mail address. In other embodiments, Contributors 208 may be identified by phone number, website or social network name, userID on a known system, a financial account identifier, a rewards program identifier, a frequent flyer program identifier, or other facility that may allow PAO 206 to access Contributors 208 through Communication Channels 211. Communications Channels 211 may include local computer networks, social networks implemented on any platform, wireless networks, wide area wired and wireless networks, electronic telephony, radio, microwave, other telecommunications, or conventional voice telephony, retail outlets, or paper based communication. In one embodiment, PAO 206 sends a description of the Item in the communication to Contributors 208. In another embodiment, PAO 206 sends a link or token representing the Item to each Contributor 208. PAO may communicate with the various Contributors 208 through communications channels 212 until sufficient payments are secured, at which point PAO 206 communicates with e-commerce site 204 to complete the transaction started by Initiator 202. Alternatively, Initiator 202 may decide to terminate the transaction, in which case PAO 206 does not complete the funds transfer and thus the transaction is not completed. In one embodiment, the payments commitments in the form of reserve holds are allowed to expire or are explicitly released so that no funds transfer occurs. In another embodiment, PAO 206 sends back funds that were obtained as payment commitments.

To facilitate the progress of the transaction, PAO 206 typically charges Contributors 208's payment mechanisms and coverts the payments to a suitable quantity of points from the payment vendor. Such payment vendor points have an equivalent monetary value to the contributions when used for the contemplated transaction, and for many other transactions available through the payment vendor. Thus, once sufficient funds in the form of points are accumulated, the Item may be purchased. If the transaction is not completed, Contributors 208 have options for the disposition of the points or may agree to allow Initiator 202 to dispose of the unused points. This allows Initiator 202 to have flexibility to scale back the cost of the Item if insufficient funds are developed, or to increase the cost of the Item if the interest from Contributors 208 indicates greater amounts of funds may be generated. The use of committed funds through conversion to points with a payment vendor allows several advantages. For example, unused or extra points may be used with the payment vendor and its associated merchants to purchase other goods or services, or alternatively may be donated to a charity. PAO 206 may further serve as a hub for multiple payment vendors, so that points may be redeployed and used in multiple situations.

In one embodiment, PAO 206 provides collection services for multiple payment vendors allowing for the use of points with any of the merchants associated with any of the vendors. For example, one association or social network may affiliate with PAO 206 and allow PAO 206 to handle all the electronic donations or campaigns amongst its members. Points may then be generated for both group purchases and/or donations and for other activities within the association or social network. Where a purchase is made through the association or social network, bonus points may be assigned to the purchaser. When the purchaser is invited to participate in a group gift or donation, the purchaser/Contributor may use a combination of saved points and further funds to make the commitment to the group gift/donation. In this embodiment, the amount of points accumulated by each member may be accessed by the member accessing a user profile portion of PAO 206, and/or PAO 206 may periodically send members an e-mail with a current account balance. In this embodiment, in addition to members contributing points to group gifts/donations, accumulated points may be transferred to others as an award or donation. Optionally, potential contributors may be identified by a sub-group designation in an association, or a defined subset of a social network (e.g., all the Initiator's friends, or all the fans of a particular element of a social network). Additionally, other entities, e.g. an airline, may offer points as a promotion or reward where those points may be redeemed in conjunction with a group gift/donation or with any merchants associated with PAO 206.

Each individual Contributor 208 typically has a separate electronic commerce payment mechanism (e.g., payment vendor 205 which may represent different credit cards, ACH accounts, wire transfers, e-Cash, etc.), and PAO 206 obtains the total payment commitment from those multiple sources to deliver to the Item Vendor (in this exemplary embodiment e-commerce site 204). One example would be a situation where family members or friends would like to share in the cost of one large flower arrangement for the funeral of a friend. Initiator 202 may select a particular flower arrangement from a particular Vendor 204, select PAO 206 as the payment option in the Vendor's shopping cart, then identify one or more Contributors 208 to fulfill the remaining cost of the Item. While an exemplary embodiment of the invention describes the Initiator as using a computer as the initiating device, the initiating device may be a cell phone, smart phone, PDA, or other device. The initiation may be done in real time, or may be processed and executed in batch style. Similarly, participation of Contributors 208 may be accomplished in real time or batch style. However, as many Items may have a time sensitive purchasing criteria, PAO 206 optionally has timing mechanisms and as close to real time processing as possible to ease the time sensitive constraints, as disclosed in further detail below.

The Initiator selects the flower arrangement as the Item, and the Item is put in to a holding portion of a shopping cart awaiting check-out and payment, as is typical of e-commerce sites. In one embodiment, the Item is held by the shopping cart merchant upon the payment or commitment of an initial deposit, typically a significant percentage of the total cost. PAO 206 may be used with any of the variety of shopping cart technologies, products or groups of products. At check out (for payment) the Initiator is provided the option of using the PayAsOne system's multi-payer process, and the initial deposit may be handled in a conventional manner with only the Initiator being involved. However, in situations where the initial deposit is beyond the ability of the Initiator to fund, PAO 206 may still be used with the caveat that the Item would not be guaranteed available until the initial deposit threshold is established. PAO 206 may be activated by the Initiator activating an element on the display screen in the form of a logo or link to the PayAsOne system on the shopping cart's check out page. Initiators selecting the PayAsOne option may thus request that others to contribute to the total cost of the Item by making a partial payment or micro-payment.

In one embodiment, funds are secured by a common credit card procedure where a designated amount is reserved once the Initiator or any Contributor commits funds. In this way, PAO maintains the funds on reserve and maintains the total of current contributed amounts. Typically, credit card companies maintain funds on reserve for about ten days before releasing the funds. In the case where the Initiator has a time constraint for participation by Contributors, if that time constraint is less than 10 days any reserved funds should be available until the expiry of the invitation. In the case where the Initiator has no time constraint, or a time constraint greater than the reserve period, PAO may include software to either renew the reserve or cancel the Contributor's participation. Similar methods are available for other payment mechanisms, where a funding amount is held by the financial institution but committed to the transaction when the transaction is consummated. In any of these methods, the Initiator may determine when the held or reserved funds are transferred and converted into points to be used by PAO 206 to complete a transaction.

In addition to the time constraint, the Initiator may also include suggested amounts of participation. In one embodiment of the invention, Contributors are limited to a select number of participation amounts. In another embodiment of the invention, a minimum payment is required. For example, in one embodiment $10 may be selected as the minimum payment, justified by transaction costs being too great a percentage of a lesser participation amount. In another embodiment of the invention, Contributors are sent an Invoice for the desired contribution amount. It is not required that there be a defined limit to the amounts being solicited from the Contributors. For example, an Initiator may decide to try to purchase a gift certificate at a particular merchant vendor or a set of merchant vendors. By virtue of a point based system, the actual deposit of monetary funds is not necessary as the points serve as a credit facility for the gift certificate until the points are redeemed.

In one embodiment, the Vendor's e-commerce site uses the PAO system to transfer the Item details (photo-description-price) to the PayAsOne check out process, where the Initiator can invite Contributors to participate with a portion of the total amount of the selected flower arrangement. In another embodiment, PAO sends web links to Contributors to provide the Item details. In another embodiment, PAO merely provides a text field for the Initiator to describe the Item. In fact, it is not necessary for PAO to communicate anything about the transaction to the Contributors. However, unless the Initiator otherwise communicates Item details to the Contributors, the Contributors may not elect to participate in paying for the item. In another embodiment, a network of merchant vendors is associated with the PAO system, and the Item details may simply refer to the various members of the merchant vendor network through which a gift certificate may be redeemed.

As shown in FIG. 2, PAO 206 separately deals with Initiator 202 and each Contributor 208 to secure payments for the Item. PAO starts with a check out page for the Initiator. At check out, the Initiator determines the portion he or she will pay. In one embodiment, the PAO check out is structured as a secure (Payment Card Industry Data Security Standard compliant, or PCI DSS compliant, or just PCI compliant) process where PayAsOne holds the Initiator and each Contributor credit card information until the total amount is committed, either by the PAO system collecting the needed amount of funds, or the PAO system reserving sufficient funds from each of the Initiator and Contributors to purchase the Item. In another embodiment, PAO system may be integrated with a PCI compliant payment processor ("Payment Processor," not shown) where funds are reserved until the total amount is aggregated then processed.

In one embodiment, the Initiator may add a personal note to be included in the delivery of the Item of the recipient of the Item, and may add a personal note to the Contributors explaining the situation. At the point the Initiator invokes the PAO system, the PAO system prompts the Initiator to identify the potential Contributors. In one embodiment, the Initiator identifies Contributors by entering e-mail addresses of the potential joint purchaser(s) and may add a note explaining the purchase—the requested contribution to the total amount—and required date for payment. The system will email the individual(s) identified by the Initiator as noted above, and may include the note from the Initiator and provide a link to the reserved item in the PayAsOne holding cart. The e-mail may also contain a username and generates a unique password for each requested Contributor, so that the second time the Contributor is invited to participate in a purchase by PAO, the process may be streamlined. In addition, the Initiator may specify a time deadline for participation, and may also set a follow up schedule for PAO to continue to send further e-mails to prompt action by potential Contributors. In one embodiment, once the Initiator has selected a time constraint, PAO automatically generates a series of reminder messages which increase in frequency as the time deadline approaches.

When the Contributor receives an invitation to participate in the purchase of an Item, Contributor may follow a link back to the PayAsOne payment processing site where he or she may sign in and see the item, note from the Initiator and requested amount, or range of amounts, to pay. Each Contributor is also provided an option to decline, and PAO may notify the Initiator if there is a decline. If not declined, PAO may accept credit card information in order to reserve the specified amount by the Contributor. Credit card or other payment information may be held in reserve until all funds for the total amount of the item is secured. In another embodiment of the invention, once an Initiator or a Contributor commits funds, PAO may process the payment and hold partial funds in the form of point until the needed funds are raised. Contributors may also add a personal note to be included in the delivery of the Item. Further, Contributors may be provided an input section or page to designate further potential Contributors, thus allowing a Contributor to also become an Initiator. This viral marketing approach may greatly enhance the ability to obtain significant commitments. The software may further check newly accepted Contributor contact information against Contributor contact information already received to try to avoid sending a duplicative participation message. Detected duplicative contact information may either be omitted from a further participation message, or the participation message sent to this duplicative contact may be modified because of the awareness of the status.

In the example of a flower order, the Flower industry typically has a limit on the length of notes (e.g., 200 characters, 270 characters for such notes). PAO makes it possible to combine multiple notes and send each such note separately, or send all notes to the Initiator and let the Initiator decide on the portions of the notes to deliver to Item recipient. Alternatively, PAO may separately deliver notes to the Item recipient apart from the flower delivery by the flower vendor.

PAO provides a monitoring page (not shown). With this monitoring page, Initiator or others may view the master account which provides updates, notification of commitments and payments made (and who made them). The PAO monitoring page has the capability to send reminders, change Contributors or edit Contributor information, delete Contributors, and or make additional commitments or payments to complete the sale of the Item. Initiator or another designee may also be sent regular e-mail updates and reminders depending on the preferred ship date of the item and status of contributing commitments or payments. Further, where Contributors have become initiators, the monitor page may provide for identifying new members of the Initiator/Contributor list in the computer memory. If one or more of the proposed Contributors declines, the Initiator may add further potential Contributors. Another option is that the Initiator may increase the amount the Initiator commits to the payment for the Item, thus reducing or eliminating the need for further contributors. In one embodiment, where the Initiator maintains contact with Contributors via a social network or similar communications system, the Initiator may send reminders to other Contributors by a text message, instant message, poke or similar communications mechanism.

When total amount needed to purchase the Item is committed, PAO then processes the individual payment mechanisms, e.g., credit card transactions or transfer of accumulated points, for all Contributors who participated. In the case of using an outside payment processor (not shown), PAO would supply final approval to authorize the outside payment processor process the credit cards. When full payment is committed and payments are processed all joint purchasers may receive a receipt indicating their participation (details of their individual invoice) and, optionally, notification of shipping of the Item. As typically payment information is sensitive, such payment information may be omitted entirely from the receipt. Optionally, an abbreviated indication of the payment mechanism may be provided on the receipt.

To complete the transaction, the PAO system generates a final order approval and sends notification back to the e-commerce site Vendor. Optionally, the PAO system may aggregate the notes from each Contributor to a form, a note or card to be included in the delivery of the Item to the recipient. Alternatively, the PAO system may separately provide notes from the Initiator and/or Contributors.

In a conventional manner, payments to the e-commerce site are remitted to the Vendor, minus standard processing fees, either electronically or by monthly reconciliation. Optionally, PAO system may include a fee in the transaction costs and receive payments through such mechanisms.

In an additional embodiment of the present invention, PAO transacts with Initiators and/or Contributors using a point based system. In this embodiment, the Initiator and Contributors transact business using points rather than money to provide the consideration to the vendor for each Item. Such points used within the PAO system may be points accumulated in loyalty programs, or other point systems where the points represent some monetary value (e.g., rewards on credit cards, airline miles, pre-paid cell phone minutes, etc.). In some of these embodiments, points may be acquired by purchasing with money, where the Initiator and/or Contributor commits funds to PAO, which PAO transacts and provides the points to the Initiator or Contributor based on the amount received by PAO. Such transaction cost adjustments described above may be made in the initial creation of points, or may be implemented with the final transaction.

To the extent that other individuals or organizations recognize the value of the points used within the PAO system, such points may be used for other (non-group) purchases or other group purchases. For purposes of the present invention, in these point system embodiments the PAO system is used by vendors that are willing to trade products and/or services for its Items. Thus, the use of points may be thought of as two transactions, a first transaction between PAO and the Initiator and Contributors wherein points are obtained by PAO with the promise PAO will deliver the Item for the specific amount of points. The second transaction is then PAO providing consideration (e.g., providing funds) to the vendor for the vendor supplying the Item. Using such a point based system, transactions may be split amongst vendors, and in the case of a network of merchant vendors any refunds may be applied to any of the merchant vendors in the network.

This first transaction may be the purchase of points by the Initiator and/or Contributors, and the subsequent commitment of the necessary amount of Points by the Initiator and/or Contributors to PAO to get an Item. Alternatively, the Initiator and/or Contributors may transfer points from other accounts, either accounts with PAO or outside accounts. For example, PAO may have arrangements with various other entities to provide a valuation of points transferred by the Initiator and/or Contributors from those third party systems. Such points would not necessarily even need to represent money, although the typical vendor would only transact with money before delivering an Item. However, in the event that a vendor would consider PAO points as valid consideration for shipping an Item, then this embodiment of the present invention would be capable of properly processing such a transaction.

In one embodiment, PAO may have each PAO point equal one dollar. Initiators and/or Contributors may purchase PAO points by providing one dollar for each point. Alternatively, an Initiator and/or Contributor may transfer, for example, airline miles to PAO for PAO points. With a particular airline, PAO may have an agreement to value the airline points at an exchange rate that works for both parties, in one example PAO may obtain fifty cents for each airline point from the airline, so that when an Initiator and/or Contributor transfers in 1000 airline points, PAO redeems the airline points for 500 dollars and provides the Initiator and/or Contributors with a credit of 500 PAO points. In the point system embodiments, funds do not need to be reserved as in the credit card situation as PAO uses its points as currency in its purchasing system. PAO would be the party directly obtaining the Item from the vendor based on value, funds, transferred to it during the purchase or transfer of points.

Figure 3A:
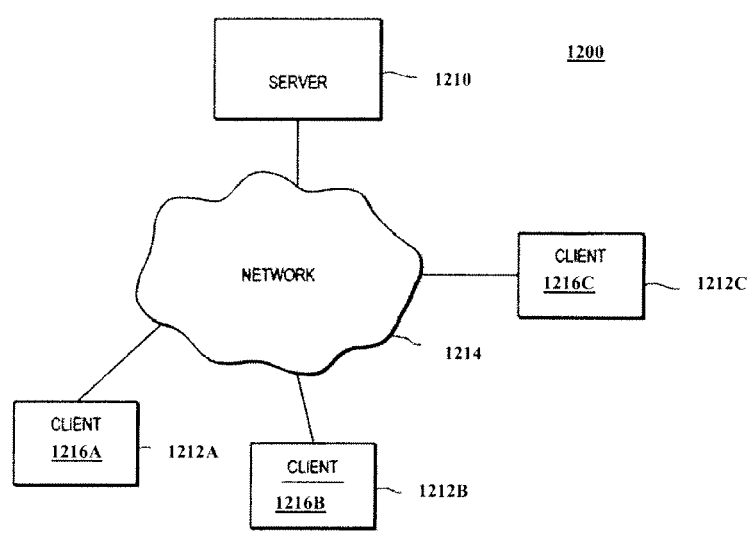
FIG. 3A is a schematic diagrammatic view of a network system in which embodiments of the present invention may be utilized.

FIG. 3A is a high-level block diagram of a computing environment 1200 according to one embodiment. FIG. 3A illustrates server 1210 and three clients 1212 connected by network 1214. Only three clients 1212 are shown in FIG. 3A in order to simplify and clarify the description. Embodiments of the computing environment 100 may have thousands or millions of clients 1212 connected to network 1214, for example the Internet. Users (not shown) may operate software 1216 on one of clients 1212 to both send and receive messages through network 1214 via server 1210 and its associated communications equipment and software (not shown). PAO 206 is succeptable of operating from any such server 1210, and Vendor 204, Initiator(s) 202, and Contributor(s) 208 may all interact via one of clients 1212.

Figure 3B:
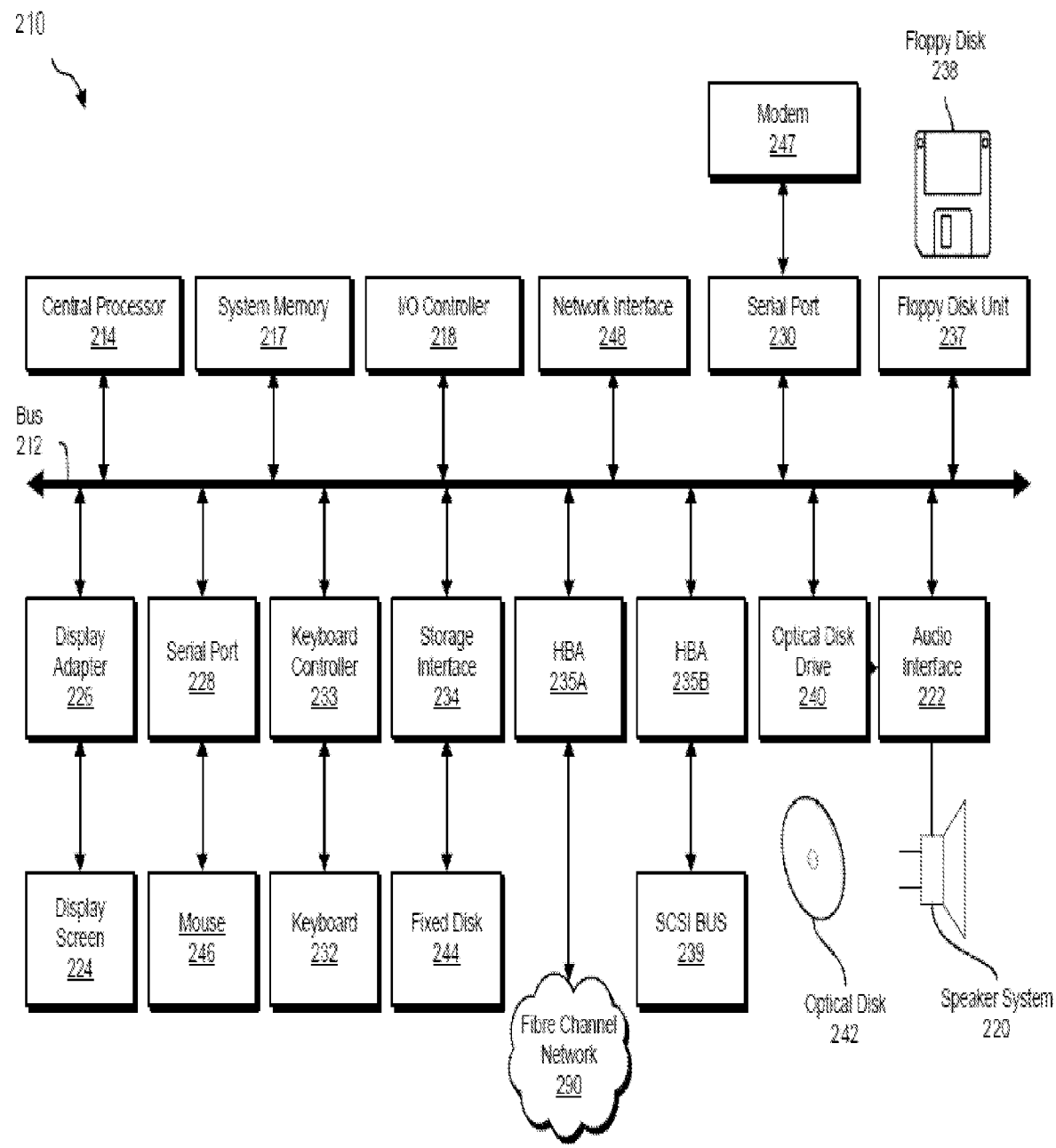
FIG. 3B is a block diagram of a computing system (either a server or client, or both, as appropriate), with optional input devices (e.g., keyboard, mouse, touch screen, etc.) and output devices, hardware, network connections, one or more processors, and memory/storage for data and modules, etc. which may be utilized in conjunction with embodiments of the present invention.

FIG. 3B depicts a block diagram of computer system 210 suitable for implementing server 1210 or client 1212. Computer system 210 includes bus 212 which interconnects major subsystems of computer system 210, such as central processor 214, system memory 217 (typically RAM, but which may also include ROM, flash RAM, or the like), input/output controller 218, external audio device, such as speaker system 220 via audio output interface 222, external device, such as display screen 224 via display adapter 226, serial ports 228 and 230, keyboard 232 (interfaced with keyboard controller 233), storage interface 234, disk drive 237 operative to receive floppy disk 238, host bus adapter (HBA) interface card 235A operative to connect with Fibre Channel network 290, host bus adapter (HBA) interface card 235B operative to connect to SCSI bus 239, and optical disk drive 240 operative to receive optical disk 242. Also included are mouse 246 (or other point-and-click device, coupled to bus 212 via serial port 228), modem 247 (coupled to bus 212 via serial port 230), and network interface 248 (coupled directly to bus 212).

Bus 212 allows data communication between central processor 214 and system memory 217, which may include read-only memory (ROM) or flash memory (neither shown), and random access memory (RAM) (not shown), as previously noted. RAM is generally the main memory into which operating system and application programs are loaded. ROM or flash memory may contain, among other software code, Basic Input-Output system (BIOS) which controls basic hardware operation such as interaction with peripheral components. Applications resident with computer system 210 are generally stored on and accessed via computer readable media, such as hard disk drives (e.g., fixed disk 244), optical drives (e.g., optical drive 240), floppy disk unit 237, or other storage medium. Additionally, applications may be in the form of electronic signals modulated in accordance with the application and data communication technology when accessed via network modem 247 or interface 248 or other telecommunications equipment (not shown).

Storage interface 234, as with other storage interfaces of computer system 210, may connect to standard computer readable media for storage and/or retrieval of information, such as fixed disk drive 244. Fixed disk drive 244 may be part of computer system 210 or may be separate and accessed through other interface systems. Modem 247 may provide direct connection to remote servers via telephone link or the Internet via an internet service provider (ISP) (not shown). Network interface 248 may provide direct connection to remote servers via direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 3B need not be present to practice the present disclosure. Devices and subsystems may be interconnected in different ways from that shown in FIG. 3B. Operation of a computer system such as that shown in FIG. 3B is readily known in the art and is not discussed in detail in this application. Software source and/or object codes to implement the present disclosure may be stored in computer-readable storage media such as one or more of system memory 217, fixed disk 244, optical disk 242, or floppy disk 238. The operating system provided on computer system 210 may be a variety or version of either MS-DOS® (MS-DOS is a registered trademark of Microsoft Corporation of Redmond, Wash.), WINDOWS® (WINDOWS is a registered trademark of Microsoft Corporation of Redmond, Wash.), OS/2® (OS/2 is a registered trademark of International Business Machines Corporation of Armonk, N.Y.), UNIX® (UNIX is a registered trademark of X/Open Company Limited of Reading, United Kingdom), Linux® (Linux is a registered trademark of Linus Torvalds of Portland, Oreg.), or other known or developed operating system.

Moreover, regarding the signals described herein, those skilled in the art recognize that a signal may be directly transmitted from a first block to a second block, or a signal may be modified (e.g., amplified, attenuated, delayed, latched, buffered, inverted, filtered, or otherwise modified) between blocks. Although the signals of the above described embodiments are characterized as transmitted from one block to the next, other embodiments of the present disclosure may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A server for accommodating multiple party payments for a single item in an e-commerce transaction, said server comprising:
    a processor with a communications device;
    vendor software module capable of execution on said processor, said vendor software module adapted to receive payment requirements from a vendor via said communications device, and to receive payment parameters from an initiator via said communications device, said payment parameters including an item payment amount and an identification of at least one contributor;
    contributor software module capable of execution on said processor, said contributor software module adapted to obtain payment information from at least two of the initiator and the at least one contributor wherein said payment information is sufficient to authorize the commitment of funds to a transaction; and
    aggregation software module capable of execution on said processor, said aggregation software module adapted to send a participation message via said communications device to at least one contributor, said participation message including information on the item, the item payment amount, and directions for the contributor to interact with said contributor software module, said aggregation software module further adapted to receive information on an additional contributor from the at least one contributor and send a participation message to the additional contributor, said aggregation software module further maintaining a total of committed funds and initiating a payment transaction when the committed funds are sufficient to pay the vendor the item payment amount.

2. The server of claim 1 wherein said vendor software module further includes a contributor designator software module enabling said contributor software module to collect a plurality of contributor identifiers, said contributor identifiers including at least two of: a telephone number, a website user name, a social network user name, a user identifier from a known computer system, a financial institution account identifier, a rewards program identifier, and a frequent flyer program identifier.

3. The server of claim 1 wherein said contributor software module further includes communication software module for enabling said processor to communicate with said contributors through at least two of the following communications channels: a local computer network, a wireless network, a wide area network, a wireless network, an electronic telephony network, radio, microwave, other telecommunications, a conventional voice telephony network, a retail outlet, and a paper based communication.

4. The server of claim 1 wherein said contributor software module further includes individual message software module enabling said processor to allow at least one of the initiator and a contributor to enter an individual message for at least one contributor.

5. The server of claim 1 wherein said aggregation software module further includes monitor software module for enabling said processor to display the current status of each contributor.

6. The server of claim 4 wherein said aggregation software module further enables the initiator to send a message to one of the contributors.

7. The server of claim 4 wherein said aggregation software module further includes software enabling said processor to automatically send reminder messages to one of the contributors according to a predetermined criteria.

8. The server of claim 1 wherein said contributor software module further includes software enabling said processor to accept contact information relating to a member of a social network in conjunction with obtaining payment information, and providing the accepted contact information to the aggregation software module to send further participation messages over a social network.

9. The server of claim 1 wherein said contributor software module further includes software for detecting accepted contact information which has previously been sent a participation message.

10. A method for accommodating multiple party payments for a single item in an e-commerce transaction, said method comprising the steps of:
   obtaining payment requirements from a vendor via a communications device of a computer, including obtaining payment parameters from an initiator via the communications device, the payment parameters including an item payment amount and an identification of at least one contributor;
   obtaining payment information from at least two of the initiator and the at least one contributor via a communications device of the computer, wherein the payment information is sufficient to authorize the commitment of funds to a transaction;
   sending a participation message via the communications device of the computer to at least one contributor, the participation message including information on the item, the item payment amount, and directions for the contributor to interact with the computer;
   receiving information on an additional contributor from the at least one contributor and sending a participation message via the communication device of the computer to the additional contributor; and
   maintaining a total of committed funds and initiating a payment transaction when the committed funds are sufficient to pay the vendor the item payment amount.

11. The method of claim 10 wherein said obtaining vendor requirements further includes collecting a plurality of contributor identifiers, said contributor o including at least two of: a telephone number, a website user name, a social network user name, a user identifier from a known computer system, a financial institution account identifier, a rewards program identifier, and a frequent flyer program identifier.

12. The method of claim 10 wherein said step of obtaining payment information further includes communicating with the contributors through at least one of the following communications channels: a local computer network, a wireless network, a wide area network, a wireless network, an electronic telephony network, radio, microwave, other telecommunications, a conventional voice telephony network, a retail outlet, and a paper based communication.

13. The method of claim 10 wherein said obtaining payment information step further includes allowing the initiator to enter an individual message for at least one contributor.

14. The method of claim 10 wherein said maintaining step further includes displaying the current status of each contributor.

15. The method of claim 14 wherein said maintaining step further allows at least one of the initiator and a contributor to send a message to one of the contributors.

16. The method of claim 14 wherein said maintaining step further includes automatically sending reminder messages to one of the contributors according to a predetermined criteria.

17. The method of claim 14 wherein said obtaining step further includes the steps of accepting contact information relating to a member of a social network in conjunction with obtaining payment information, and providing the accepted contact information to a computer software module to send further participation messages over a social network.

18. The method of claim 10 wherein said providing step includes detecting accepted contact information which has previously been sent a participation message.

19. Computer readable media storing a plurality of non-transitory instructions for enabling a computer to perform the following method for accommodating multiple party payments for a single item in an e-commerce transaction which comprises the steps of:
   obtaining payment requirements from a vendor via a communications device of a computer, including obtaining payment parameters from an initiator via the communications device, the payment parameters including an item payment amount and an identification of at least one contributor;
   obtaining payment information from at least two of the initiator and the at least one contributor via a communications device of the computer, wherein the payment information is sufficient to authorize the commitment of funds to a transaction;
   sending a participation message via the communications device of the computer to at least one contributor, the participation message including information on the item, the item payment amount, and directions for the contributor to interact with the computer;
   receiving information on an additional contributor from the at least one contributor and sending a participation message via the communication device of the computer to the additional contributor; and
   maintaining a total of committed funds and initiating a payment transaction when the committed funds are sufficient to pay the vendor the item payment amount.

20. The media of claim 19 wherein said method step of obtaining vendor requirements further includes collecting a plurality of contributor identifiers, said contributor o including at least two of: a telephone number, a website user name, a social network user name, a user identifier from a known computer system, a financial institution account identifier, a rewards program identifier, and a frequent flyer program identifier.

21. The media of claim 19 wherein said method step of obtaining payment information further includes communicating with the contributors through at least one of the following communications channels: a local computer network, a wireless network, a wide area network, a wireless network, an electronic telephony network, radio, microwave, other telecommunications, a conventional voice telephony network, a retail outlet, and a paper based communication.

22. The media of claim 19 wherein said method step of obtaining payment information further an includes allowing the initiator to enter an individual message for at least one contributor.

23. The media of claim 19 wherein said method step of maintaining further includes displaying the current status of each contributor.

24. The media of claim 23 wherein said method step of maintaining further allows at least one of the initiator and a contributor to send a message to one of the contributors.

25. The media of claim 23 wherein said method step of maintaining further includes automatically sending reminder messages to one of the contributors according to a predetermined criteria.

26. The media of claim 19 wherein said method step of obtaining further includes the steps of accepting contact information relating to a member of a social network in conjunction with obtaining payment information, and providing the accepted contact information to a computer software module to send further participation messages over a social network.

27. The media of claim 19 wherein said method step of providing step includes detecting accepted contact information which has previously been sent a participation message.

* * * * *